United States Patent
Szymanski et al.

(10) Patent No.: US 11,136,014 B2
(45) Date of Patent: Oct. 5, 2021

(54) BRAKE FLUID CONTAINER SYSTEM ASSIGNED TO THE BLOCK OF THE ACTUATOR OF THE BRAKING SYSTEM

(71) Applicant: Robert Bosch GmbH, Stuttgart (DE)

(72) Inventors: Maciej Szymanski, Wroclaw (PL); Andreas Weh, Sulzberg (DE); Dieter Pflaum, Krugzell (DE); Eligiusz Stefaniak, Sobotka (PL); Francois Gaffe, La Turballe (FR); Juergen Tandler, Fuessen (DE); Piotr Lasmanowicz, Wilczyce (PL); Xingyuan Wang, Kempten (DE)

(73) Assignee: Robert Bosch GmbH, Stuttgart (DE)

( * ) Notice: Subject to any disclaimer, the term of this patent is extended or adjusted under 35 U.S.C. 154(b) by 63 days.

(21) Appl. No.: 16/635,662

(22) PCT Filed: Jul. 31, 2018

(86) PCT No.: PCT/EP2018/070690
§ 371 (c)(1),
(2) Date: Jan. 31, 2020

(87) PCT Pub. No.: WO2019/025421
PCT Pub. Date: Feb. 7, 2019

(65) Prior Publication Data
US 2021/0122345 A1    Apr. 29, 2021

(30) Foreign Application Priority Data
Aug. 4, 2017  (FR) ........................ 1757526

(51) Int. Cl.
*B60T 11/26* (2006.01)
*B60T 8/36* (2006.01)

(52) U.S. Cl.
CPC ............. *B60T 11/26* (2013.01); *B60T 8/368* (2013.01)

(58) Field of Classification Search
CPC .......... B60T 11/22; B60T 11/26; B60T 17/06; B60T 8/368
See application file for complete search history.

(56) References Cited

U.S. PATENT DOCUMENTS 5,647,212 A    7/1997 Coleman
7,299,631 B2 * 11/2007 Bourlon ................. B60T 11/22
                                                60/585

(Continued)

FOREIGN PATENT DOCUMENTS

DE    19738334 A1    3/1998
EP    0703132 A2    3/1996

(Continued)

OTHER PUBLICATIONS

International Search Report for PCT/EP2018/070690, dated October 25, 2018.

*Primary Examiner* — Thomas E Lazo
(74) *Attorney, Agent, or Firm* — Norton Rose Fulbright US LLP; Gerard Messina

(57) ABSTRACT

A brake fluid container system for fastening on the upper side of the valve block of the braking system, the block including a rear side, a conducting side and a front side in the longitudinal installation direction of the block in the engine space of the vehicle. On its rear corner, the upper side of the container includes a transverse axle, and in the longitudinal distance equal to the distance of the front and rear sides of the block, the underside supports a fastening tab. On its rear wall, the block includes a transverse bracket (Continued)

for accommodating the axle of the container, and on the front side, a fastening point for the fastening tab of the container.

6 Claims, 8 Drawing Sheets

(56) References Cited

U.S. PATENT DOCUMENTS

| | | | | |
|---|---|---|---|---|
| 9,428,168 | B2* | 8/2016 | Maruo | B60T 8/38 |
| 10,000,193 | B2* | 6/2018 | Han | B60T 8/368 |
| 10,668,908 | B2* | 6/2020 | Martinez | B60T 17/06 |
| 2014/0216866 | A1* | 8/2014 | Feigel | B60T 13/66 |
| | | | | 188/156 |
| 2015/0360670 | A1* | 12/2015 | Lange | B60T 11/26 |
| | | | | 403/376 |
| 2016/0185329 | A1* | 6/2016 | Lee | B60T 13/662 |
| | | | | 303/10 |
| 2016/0185330 | A1* | 6/2016 | Lee | B60T 8/368 |
| | | | | 303/10 |
| 2018/0065605 | A1* | 3/2018 | Leiber | B60T 7/042 |
| 2020/0010069 | A1* | 1/2020 | Mallmann | B60T 11/22 |
| 2020/0216049 | A1* | 7/2020 | Alili | B60T 11/22 |
| 2020/0262405 | A1* | 8/2020 | Weh | B60T 11/22 |
| 2020/0391712 | A1* | 12/2020 | Mallmann | B60T 13/745 |

FOREIGN PATENT DOCUMENTS

| | | |
|---|---|---|
| GN | 101945787 A | 1/2011 |
| JP | H06001074 U | 1/1994 |
| JP | H06002074 U | 1/1994 |
| JP | H09286318 A | 11/1997 |
| JP | 2004075003 A | 3/2004 |
| JP | 2005289185 A | 10/2005 |
| KR | 20030087263 A | 11/2003 |
| WO | 2013077342 A1 | 5/2013 |

* cited by examiner

BRAKE FLUID CONTAINER SYSTEM ASSIGNED TO THE BLOCK OF THE ACTUATOR OF THE BRAKING SYSTEM

FIELD OF THE INVENTION

The present invention relates to a brake fluid container system for fastening on the upper side of the valve block of the actuator of the braking system and for connecting the openings of the block for feeding and recirculating brake fluid through the openings of the underside of the container, the block including a rear side, a conducting side and a front side in the longitudinal installation direction of the block into the engine space of the vehicle. In other words, the present invention relates to an aggregate, which is formed by a brake fluid container and a valve block that accommodates this container, and including a fastening arrangement (apparatus/device), which is intended to cooperate with the fastening arrangement of the container.

BACKGROUND INFORMATION

There are numerous configurations of brake fluid containers for connecting them to the valve block that supplies them and/or with which brake fluid is exchanged. These known approaches generally involve configuring a screw connection with seals inserted in between. In general, the use of this approach in connection with a vehicle assembly line is relatively complicated in the long term.

SUMMARY OF THE INVENTION

An object of the present invention is to develop a brake fluid container system, which is light and easy to assemble or is easy to disassemble by simple rotation, which makes it possible to quickly produce the tightness between the openings of the brake fluid container and the inlets to the valve block and to reduce the danger of damage to the seals between the container and the upper side of the block.

For this purpose, the present invention relates to a brake fluid container system of the kind defined above, wherein A. at its rear corner, the upper side of the container includes a transverse joint axle and in the longitudinal distance relative to the axle equal to the distance of the front and rear sides of the block, the underside includes a fastening tab, B. at its rear wall, the valve block includes a transverse bracket for fastening the axle of the container, and on its front side, a fastening point for the fastening tab of the container.

This container system has the advantage that it is easy to manufacture, both in terms of the actual container and in terms of the complementary assembly arrangement carried by the valve block.

These assembly arrangements do not engage in the interior of the valve block since, on the one hand, they are fastened to the rear side of the block and, on the other hand, are formed by a fastening point on the front side of the block.

The assembly of this container is particularly simple, since it involves inserting the axle into the transverse bracket for fastening on the rear side of the valve block, and then pivoting the container so that it abuts the upper side of the valve block or, more precisely, brings the outlet openings of the container into contact with the openings of the upper side of the block, the seals either being integrated or being situated beforehand on or in the openings of the two elements to be connected.

The simple pivoting of the container in relation to the upper side of the block results in an exact positioning of the container on the block with no translational movement that could displace the seals between the openings.

Then, when the container is lowered and placed in position, it is sufficient to fasten the front area of the container on the valve block.

The fastening point may be a thread in the front side of the block, and the fastening tab includes a hole that accommodates a screw, which passes through the fastening tab of the container to be screwed into the block.

The container is fastened on the block using this simple pivot and screw motion.

According to one advantageous feature, the transverse axle of the container is supported by tabs, which are connected to the rear side of the container and above which the axle protrudes on both sides.

These tabs are connected over their entire height to the lower part of the container and extend over a width essentially corresponding to the width of the block, so that the container is not held along a line that would correspond essentially to the line of the axle, but on a surface, as a result of which the contact forces of the container on the block are well distributed with no risk of deformation of the container and, thereby, diminishing the contact forces that ensure the tightness of the connection between the container and the valve block.

According to another feature, the transverse fastening bracket, which is supported by the rear side of the block, has the shape of a fork, whose two tines, which are spaced apart on the container by the distance of the bracket supporting the axle, end in bearings in the form of hooks open to the front and closed above, in order to accommodate the two ends of the axle supported by the container.

This transverse bracket shape ensures on the one hand an excellent positioning of the axle and the retention of this positioning, since it extends over a large width.

According to another feature, the transverse axle of the container is supported by two tabs, which are connected to the rear side of the container and are fastened at the two ends of the transverse axle of the container, and the transverse fastening bracket supported by the block has the shape of a fork provided with one tine, the end of which forms a hook-shaped bearing, which is open to the front and closed above, in order to accommodate the part of the transverse axle between the two tabs connected to the rear side of the container.

This embodiment variant of the pivot point is just as simple as the preceding embodiment variant in its implementation and its use.

The aggregate thus formed of, on the one hand, the transverse axle of the container, which is supported by the tabs, which are connected to the entirety of the rear side of the container and to the transverse fastening bracket in the shape of a fork, implement a pivot point and a contact, which absorbs the contact forces of the container on the upper side of the block.

Since the hooks on the upper side are closed, they enable the reaction forces to be easily absorbed in an upward direction.

Thus, the container is held not only transversely by the pivot point, but also forward by the fastening point, which is formed by the tab with the screw and the thread. The entirety of the container is therefore perfectly stabilized, even though it involves a simple connection arrangement that connects the container to the block.

The present invention is described in greater detail below with the aid of an exemplary embodiment of a brake fluid container system, which is depicted in the appended drawings.

DETAILED DESCRIPTION

Figure 1:
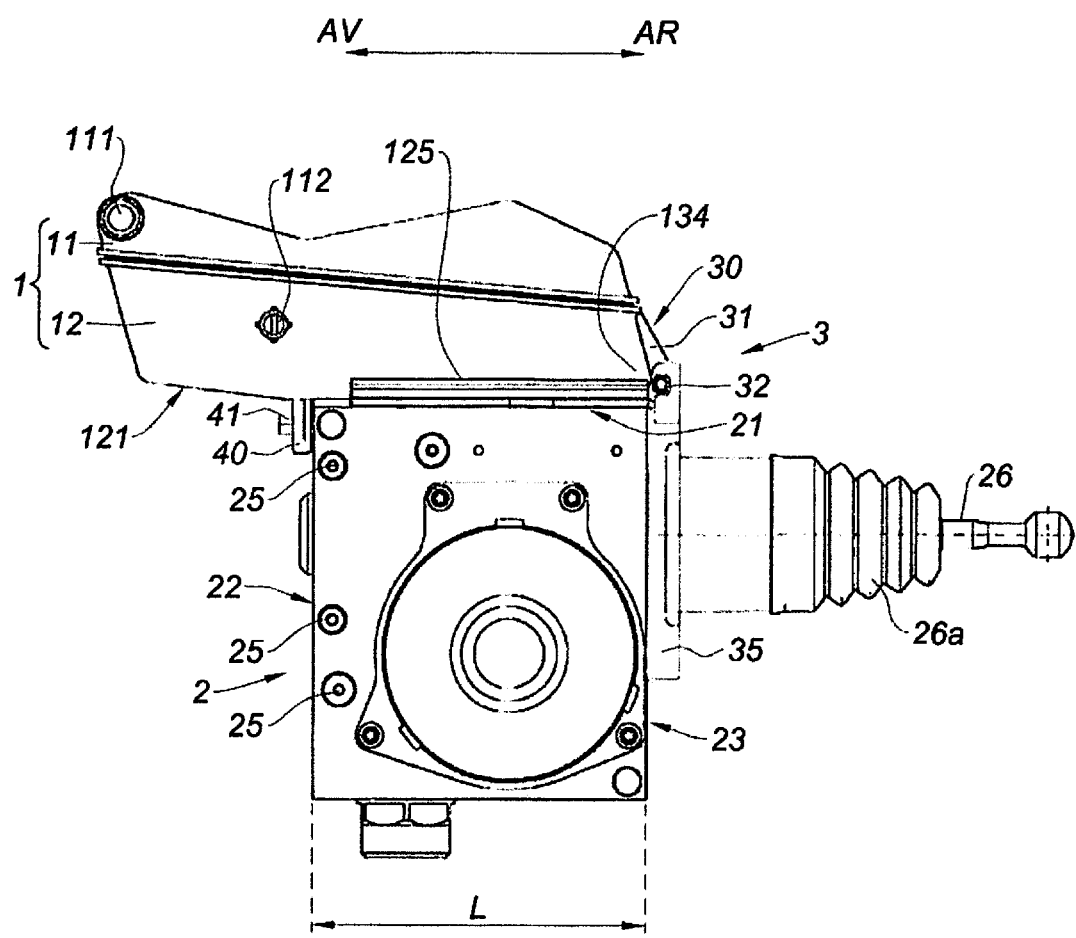
FIG. 1 is a side view of the container system, which is installed on the valve block of the actuator of the braking system.
Figure 2:
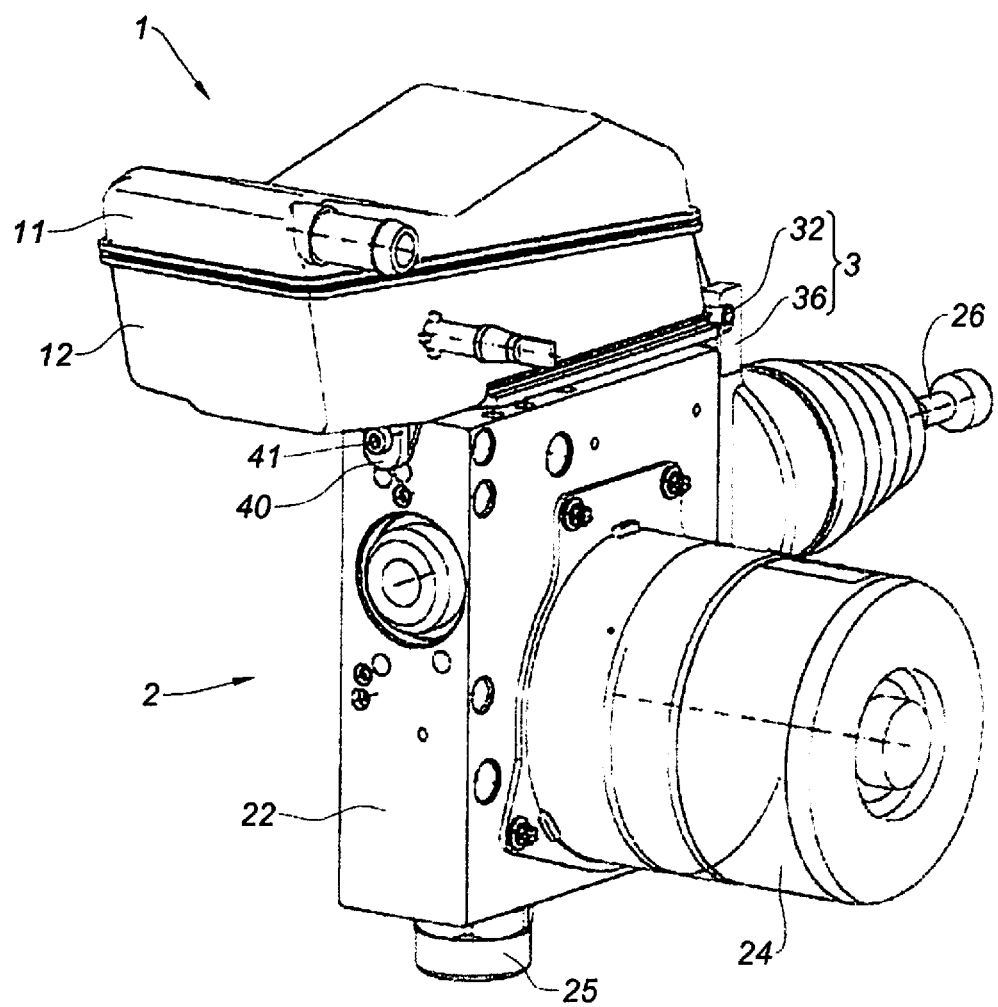
FIG. 2 is a front perspective view of the container system.
Figure 3:
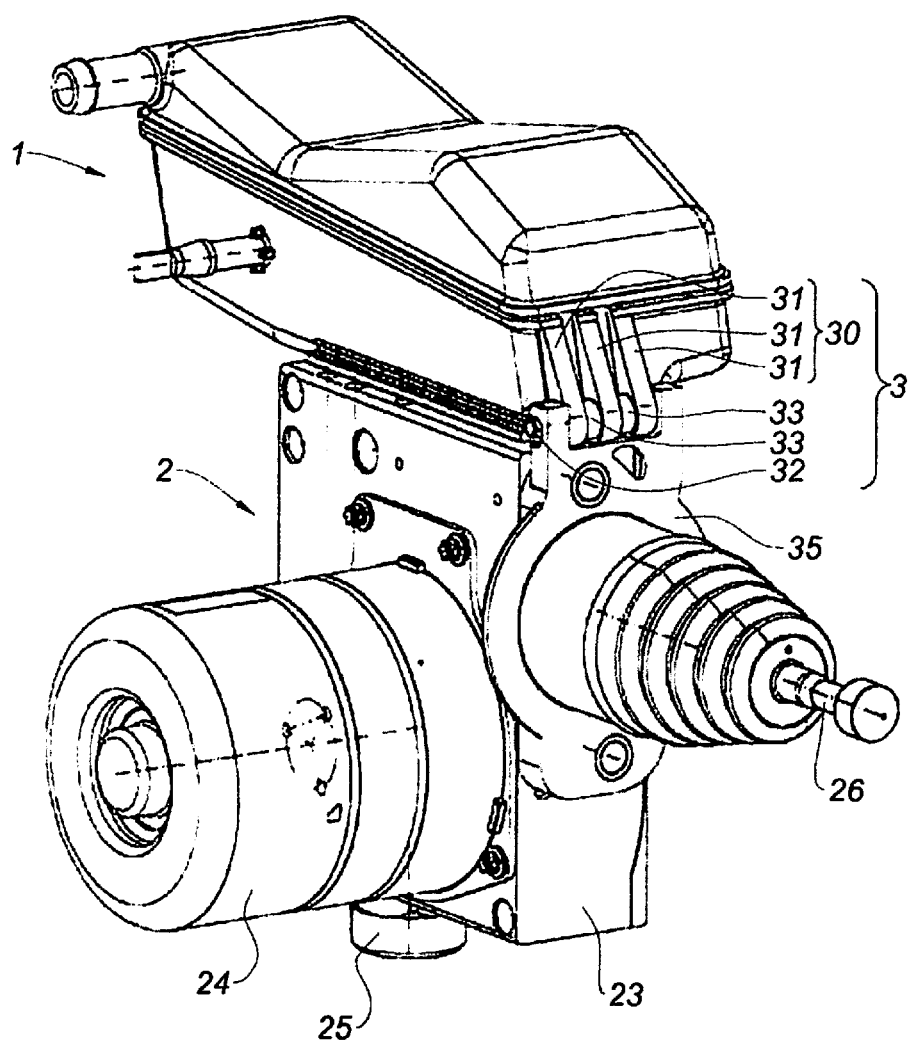
FIG. 3 is a rear perspective view of the container system.

According to FIGS. 1, 2, 3, the present invention relates to a brake fluid container system 1, which is removably fastened on the upper side of valve block 2 of the actuator of the braking system, with which it exchanges brake fluid.

The actuator, not depicted in detail, has the shape of a parallelpiped block including an upper side 21 and two lateral surfaces 22, 23 separated from one another by the distance L.

For purposes of description, block 2 is depicted oriented in the longitudinal direction of the engine compartment of the vehicle into which it is installed. This orientation corresponds to the usual orientation of the installation of block 2 in front of the wall that separates the engine compartment from the passenger compartment, near the placement of the brake pedal which, in turn, is inside the passenger compartment. This orientation is depicted in FIG. 1 by double arrow AV, AR for designating front side AV and rear side AR.

The figures show details of block 2, as well as its actuator 24 and outlet 25 to the brake circuit or brake circuits.

Block 2 is provided with control rod 26, which is surrounded by a blower 261. Control rod 26 is connected to the brake pedal by a slider (not depicted), in order to transmit the brake commands to block 2.

Figure 2A:
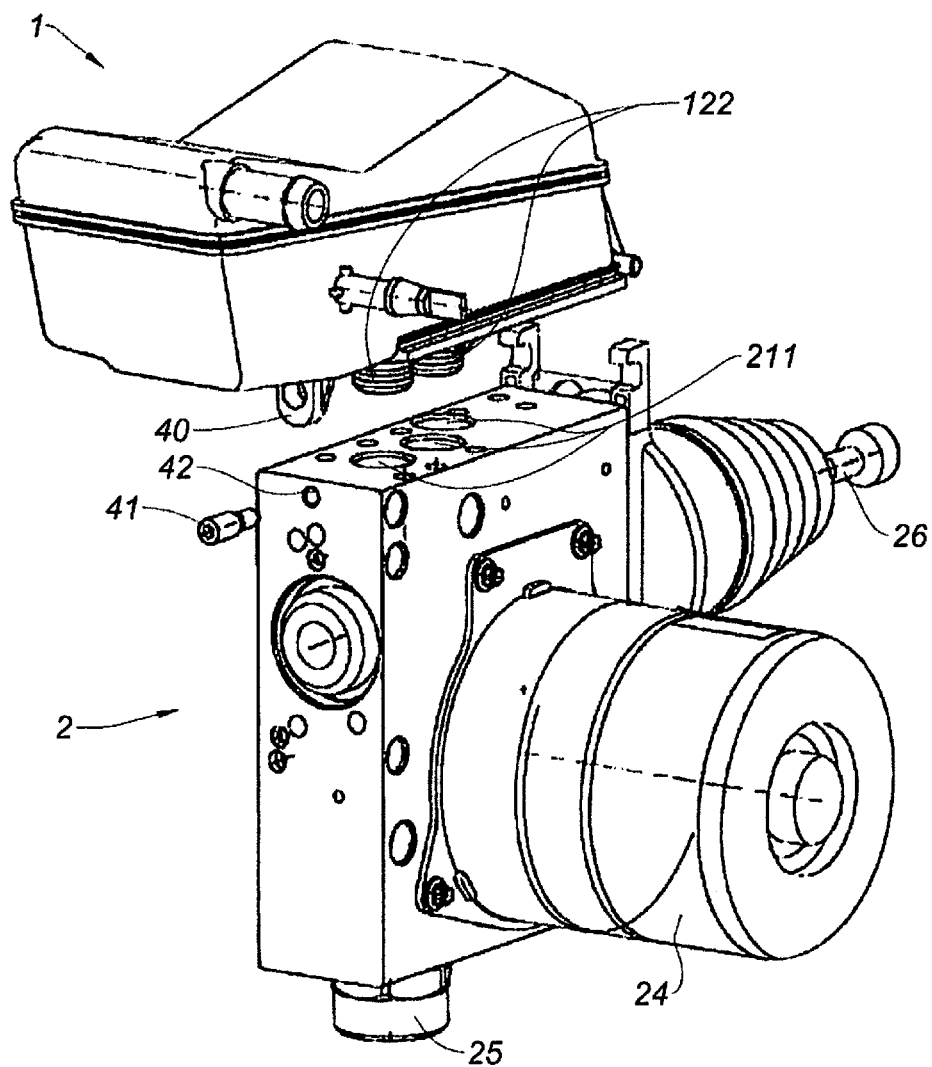
FIG. 2A is a disassembled view of the container and of the valve block corresponding to FIG. 2.

In this context, block 2 has a front side 22 and a rear side 23 and between these an upper side 21, which is provided with two or three openings 211 in order to cooperate with as many openings as are provided in the bottom of container 1, in order to supply valve block 2 with brake fluid (FIG. 2A).

Container 1 is a molded part made of a plastic molding, in general, formed from two parts 11, 12 joined together, an upper part 11 and a lower part 12. The upper part of container 1 is provided with a filling nozzle 111 and a coupler line 112.

Figure 1A:
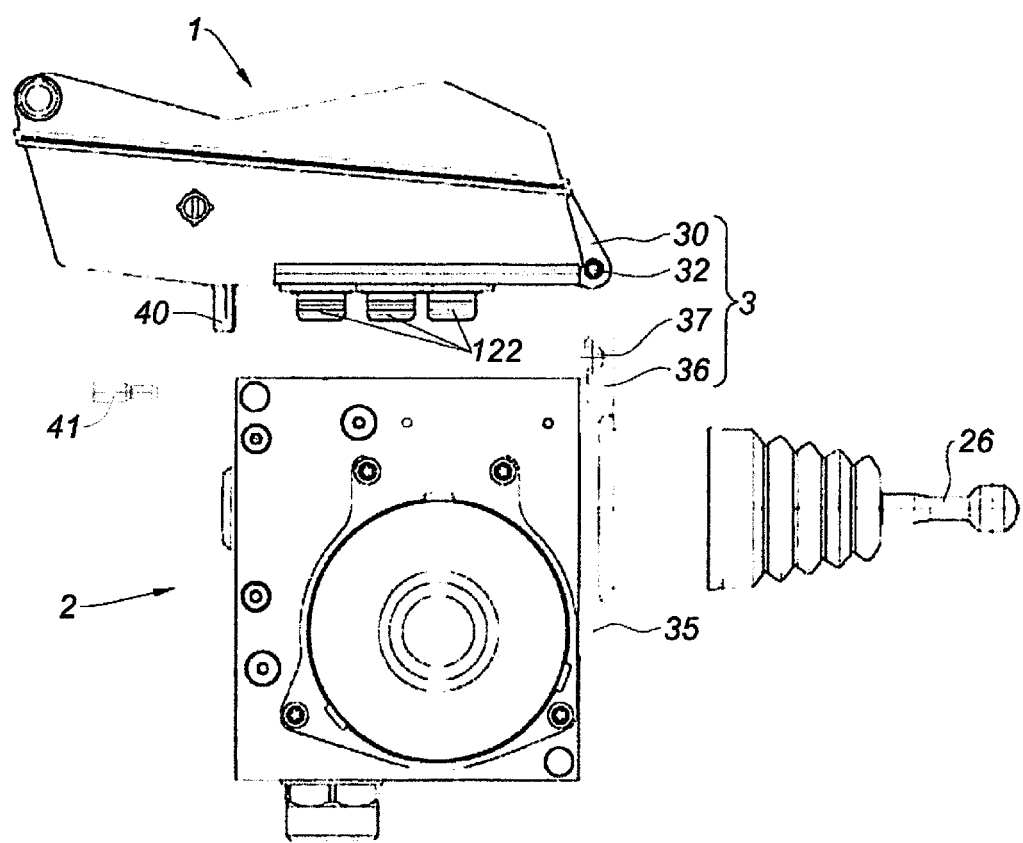
FIG. 1A is a disassembled view of the container and of the valve block corresponding to FIG. 1.

Lower part 121 of container 1 includes openings 122 in order to cooperate with openings 211 of upper part 21 of block 2 (FIG. 1A). Container 1 is connected to block 2 by a pivot point 3, which is formed by a part connected to container 1 and a part connected to block 2 and which extends over the entire width of block 2 in order to ensure the retention of container 1 on block 2 in the transverse direction.

Rear side 123 of the container (FIG. 3) is provided with a cross-member 30 having width E, which is formed by tabs 31, which support axle 32 and which protrude from both sides of tabs 31 in a transverse orientation, i.e., perpendicular to the plane of FIG. 1. As is more clearly apparent in FIG. 3, triangular shaped tabs 31 protrude upwardly on rear side 123 of the container. These tabs 31, which occupy the entire height of lower part 12 in the manner of buttresses, numbering three in the present case, are spaced apart from one another and separated in the area of the passage of axle 32 by intermediate elements 33 in order to render this structure lighter and at the same time to preserve a sound transverse stability, which is necessary for holding container 1 in the installed position.

Under these conditions, the joint of container 1 with its axle 32 occupies a width practically equal to that of block 2.

The two edges of underside 121 of container 1 are provided with grab bars 125 for the assembly line.

Axle 32 is located above rear corner 124 of container 1.

Figure 3A:
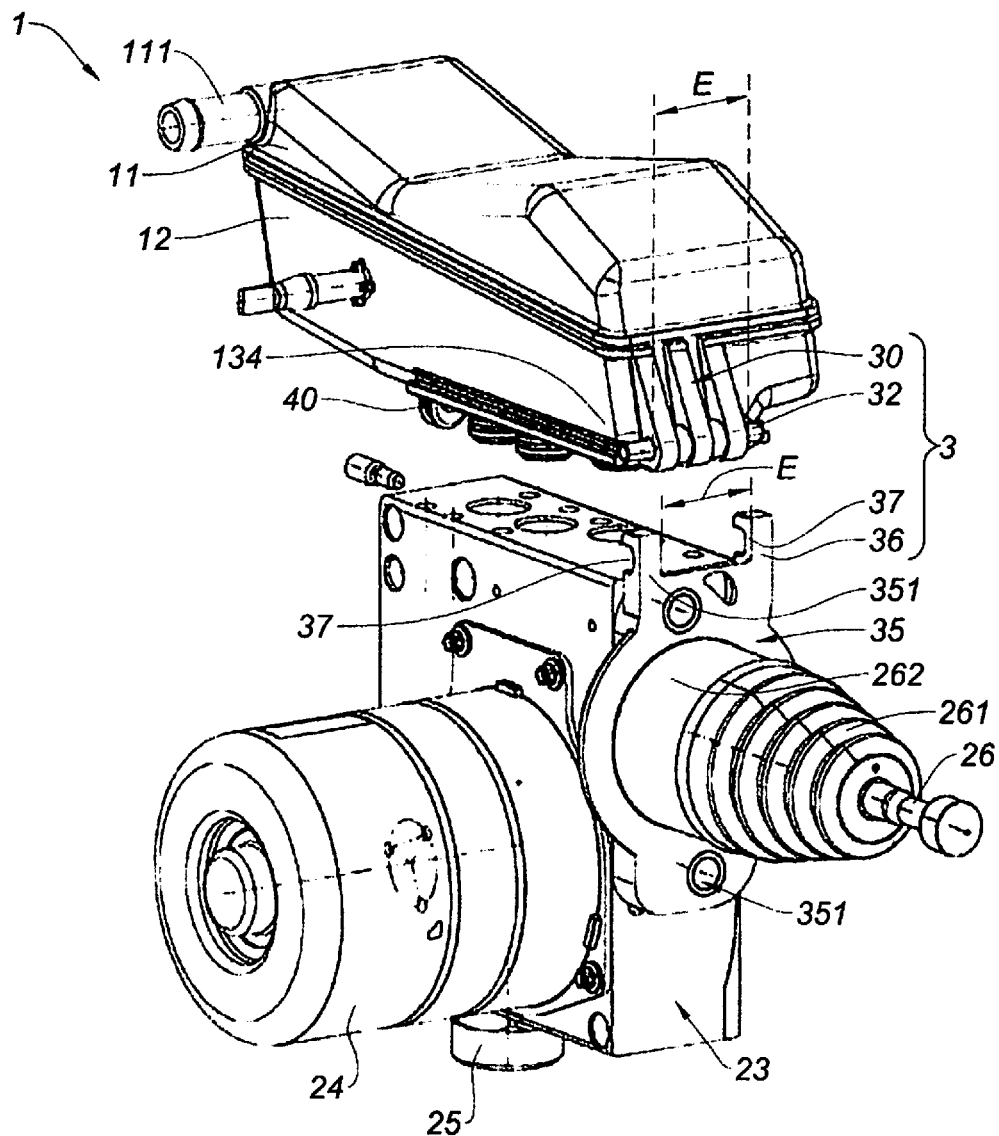
FIG. 3A is a disassembled view of the container and of the valve block corresponding to FIG. 3.

Rear side 23 of block 2 is provided with a transverse bracket 35 in the shape of a fork in conformity with the pivot and blocking arrangement of container 1, in which the distance of the opposite tine 36 is essentially equal to distance E of support 30 formed by tabs 31, which support axle 32 (FIG. 3A).

Bracket 35 has a ring-shaped body, which surrounds a tubular element 262, which is passed through by control rod 26 and the components connected to the control rod inside block 2, the extension of which forms this element.

Bracket 35 is fastened on rear side 23 of block 2 by screws 351 (FIG. 3A).

The two tines 36 end in a bearing 37 in the shape of a hook open to the front and in a cross section that corresponds to the diameter of axle 32 of container 1. The hooks of bearing 37 are closed above in order to hold axle 32 in the vertical direction, which is the vertical direction of the reaction of the container, installed and rested on upper side 21 of block 2.

In front, underside 121 of container 1 includes a fastening tab 40 at a distance L corresponding to the distance of front/rear sides 22, 23 of block 2, in order to accommodate a screw 41, which is screwed into a thread in a position homologous to that of front side 22 of block 2, thereby forming a support point.

Figure 4:
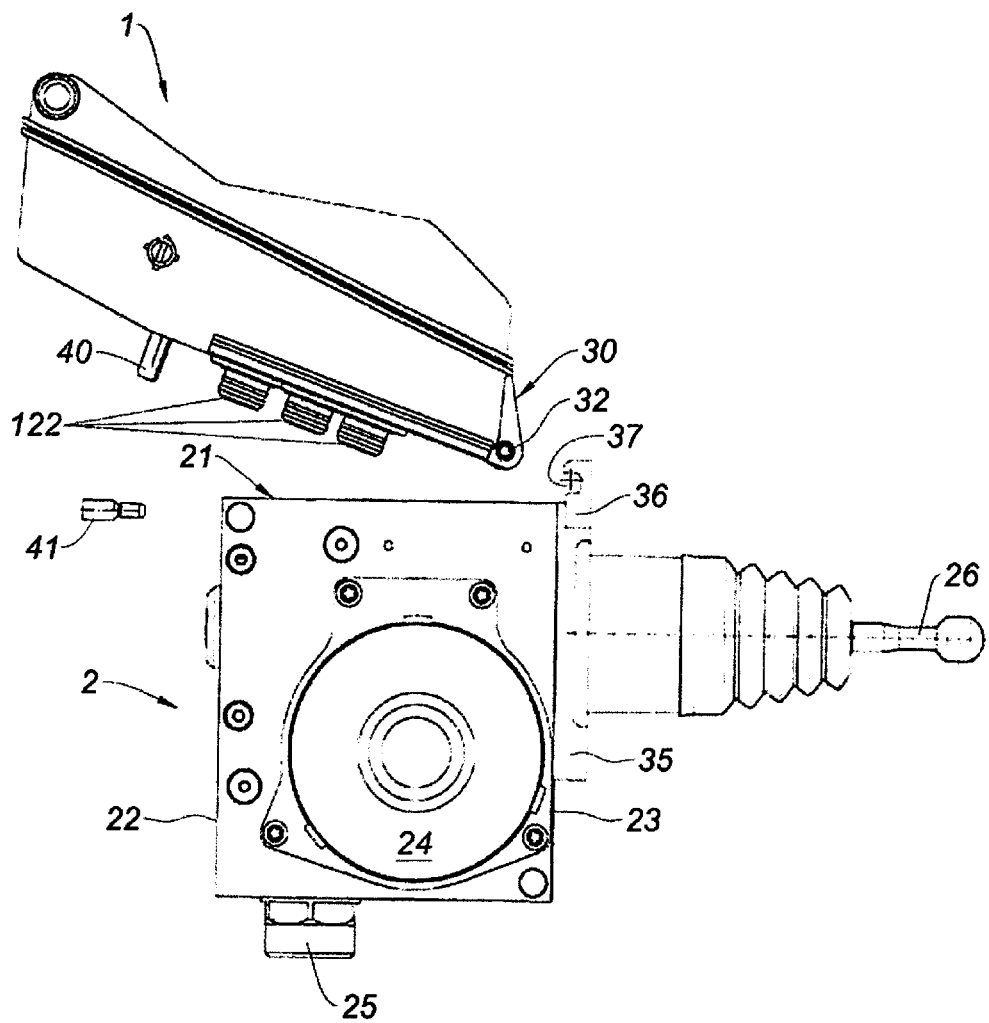
FIG. 4 is a separate view of the container and of the valve block.

The positioning (or the reverse movement) of container 1 on block 2 takes place, as depicted in FIG. 4, by inserting cross-member 32 between tines 36 of transverse bracket 35 and by positioning the two ends of axle 32 into bearing 37 of transverse bracket 35, and then by blocking via tab 40 screwed onto block 2.

The dimensions and the play between the fastening arrangement of container 1 and that of block 2 are such that the descending pivotal movement of container 1 between bearings 37 presses underside 121 of container 1 with its openings in the shape of shoulders 122 against openings 211 of upper side 21 of block 2, which are provided with sealants in order to produce the tightness of this connection, the tightness being maintained laterally by the shoulders of the container and by the sealant in the openings of block 2.

Figure 5:
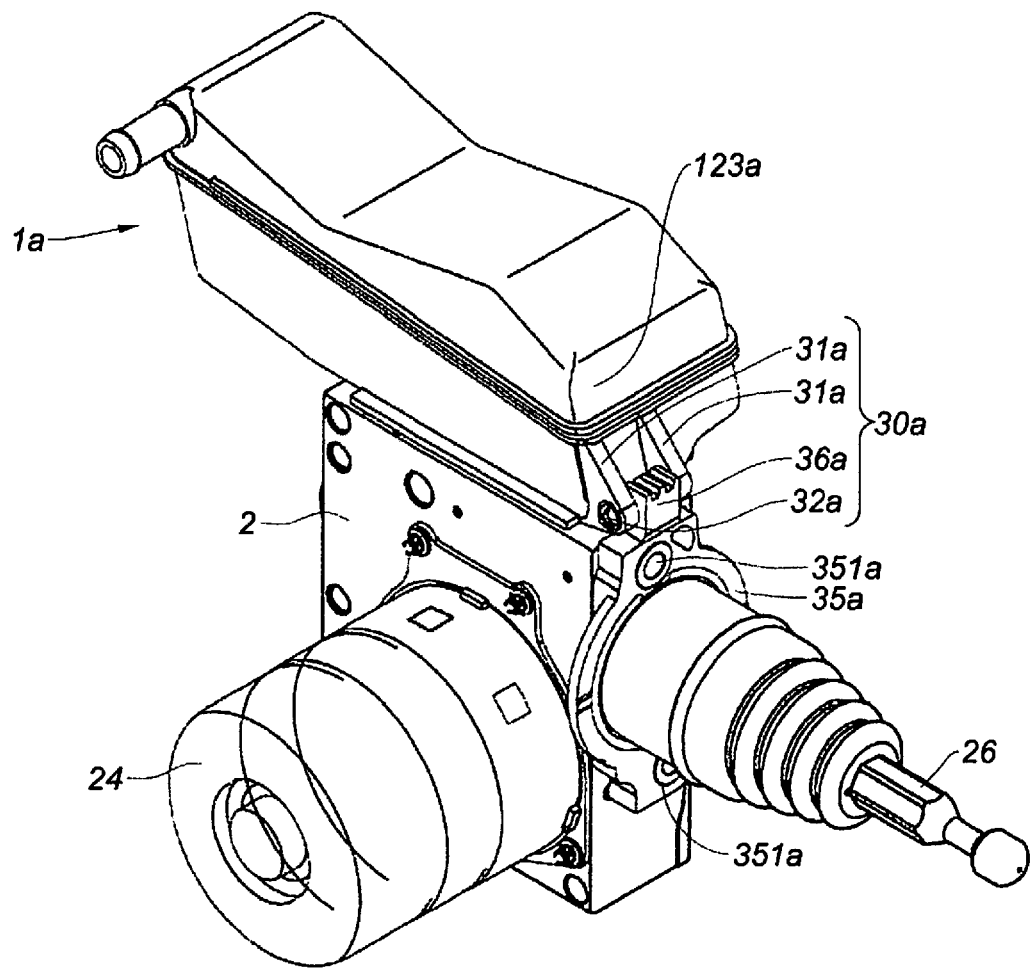
FIG. 5 is an isometric rear view of another specific embodiment of the container system according to the present invention.

FIG. 5 shows a variant 3a of previously described pivot point 3 and differs only in the relative positioning of transverse bracket 35 and of cross-member 30.

In this variant of a pivot point 3a, axle 32a is supported at its two ends by tabs 31a, which are connected to container 1a and which have a shape similar to that of previously described tabs 31. Support fork 35a has only one tine 36a with a width equal to that of the remaining intermediate space between tabs 31a. The other elements of this variant of container 1a and bracket 35a are identical to those described above and bear the same reference numerals, supplemented by the suffix a.

This variant is just as easy to implement and to install as the embodiment described above.

The List of Reference Numerals is as follows:
1 container
  11 upper part of the container
    111 filling nozzle
    112 coupler line
  12 lower part of the container
    121 underside
    122 opening
    123 rear side
    124 rear corner
    125 grab bar on the assembly line
2 valve block
  21 upper side
    211 opening
  22 front side
  23 rear side
  24 actuator
  25 outlet to braking system
  26 control rod
    261 blower
    262 tubular element
3, 3a pivot point
  30, 30a cross-member
  31, 31a tabs
  32, 32a axle
  33 intermediate elements
  35, 35a fork-shaped transverse bracket
    351, 351a screw
  36, 36a tine
  37 bearing
  40 fastening tab
  41 screw
  42 thread

What is claimed is:

1. A brake fluid container system, comprising:
a container for fastening on an upper side of a valve block of an actuator of the braking system and for connecting to openings of the block for feeding and recirculating brake fluid through the openings of an underside of the container, the block including a rear side, a conducting side and a front side in the longitudinal installation direction of the block in the engine space of the vehicle;
wherein at its rear corner, the upper side of the container includes a transverse joint axle and in the longitudinal distance relative to the axle equal to the distance of the front and rear sides of the block, the underside carries a fastening tab, and
wherein at its rear wall, the valve block includes a transverse bracket for fastening the axle of the container, and on its front side, a fastening point for the fastening tab of the container.

2. The container system of claim 1, wherein the fastening point is a thread, and the fastening tab includes a hole that accommodates a screw, which passes through the fastening tab of the container.

3. The container system of claim 1, wherein the transverse axle of the container is supported by tabs, which are connected to the rear side of the container, and from which the axle protrudes on both sides.

4. The container system of claim 1, wherein the transverse fastening bracket has the shape of a fork, whose two tines, which are spaced apart by the distance of the support carrying the axle, end in bearings in the shape of hooks open to the front and closed on the upper side, in order to accommodate the two ends of the axle.

5. The container system of claim 1, wherein the transverse axle of the pivot point of the container is supported by tabs, which are connected to the rear side of the container, the tabs numbering two supporting the axle with their two ends.

6. The container system of claim 1, wherein the pivot point includes a transverse fastening bracket in the shape of a fork, which has one tine of a width essentially equal to the remaining intermediate space between the two tabs supporting the transverse axle, the tine ending in a bearing in the shape of a hook open to the front and closed on the upper side for accommodating the axle.

* * * * *